United States Patent
Cao

(10) Patent No.: US 9,430,121 B2
(45) Date of Patent: Aug. 30, 2016

(54) MENU MANAGEMENT METHOD AND ELECTRONIC DEVICE HAVING MENU MANAGEMENT FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 453 days.

(21) Appl. No.: 14/098,605

(22) Filed: Dec. 6, 2013

(65) Prior Publication Data

US 2014/0181743 A1    Jun. 26, 2014

(30) Foreign Application Priority Data

Dec. 22, 2012   (CN) .......................... 2012 1 0561765

(51) Int. Cl.
  *G06F 3/0482*   (2013.01)
  *G06F 3/0484*   (2013.01)
  *G06F 9/44*     (2006.01)

(52) U.S. Cl.
  CPC ......... *G06F 3/0482* (2013.01); *G06F 3/04842* (2013.01); *G06F 8/38* (2013.01)

(58) Field of Classification Search
  CPC ..... G06F 3/0482; G06F 3/04842; G06F 8/38
  See application file for complete search history.

(56) References Cited

U.S. PATENT DOCUMENTS

| | | | |
|---|---|---|---|
| 2004/0121814 A1* | 6/2004 | Creamer ........... | H04M 1/72583 455/563 |
| 2008/0228963 A1* | 9/2008 | Hironaka ............... | G06Q 10/06 710/36 |
| 2008/0246736 A1* | 10/2008 | Han ...................... | G06F 3/0488 345/173 |
| 2010/0257239 A1* | 10/2010 | Roberts .................. | G06Q 10/10 709/204 |
| 2013/0219303 A1* | 8/2013 | Eriksson ............... | G06F 3/1454 715/759 |
| 2013/0311911 A1* | 11/2013 | McCoy .................... | G06F 8/38 715/762 |

* cited by examiner

*Primary Examiner* — Anil Bhargava
(74) *Attorney, Agent, or Firm* — Zhigang Ma

(57) ABSTRACT

A first electronic device having a first operating menu communicates with a second electronic device having a second operating menu. The second operated menu is obtained by the first electronic device from the second electronic device and is stored in the first electronic device. Each operating options of the second operating menu is correlated with one of applications of the first electronic devices. When an operating option of the second operation menu stored in the first electronic device is operated, a corresponding application of the first electronic device correlated with the operated option is activated.

12 Claims, 4 Drawing Sheets

MENU MANAGEMENT METHOD AND ELECTRONIC DEVICE HAVING MENU MANAGEMENT FUNCTION

BACKGROUND

1. Technical Field

Embodiments of the present disclosure relate to electronic devices, and particularly to a menu management method and an electronic device having a menu management function.

2. Description of Related Art

Different electronic devices, such as mobiles phones and tablet computers, may have different operating menus. When a user uses a new electronic device, he/she may need to spend a lot of time to adapt and learn how to operate a menu of the new electronic device, which is inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
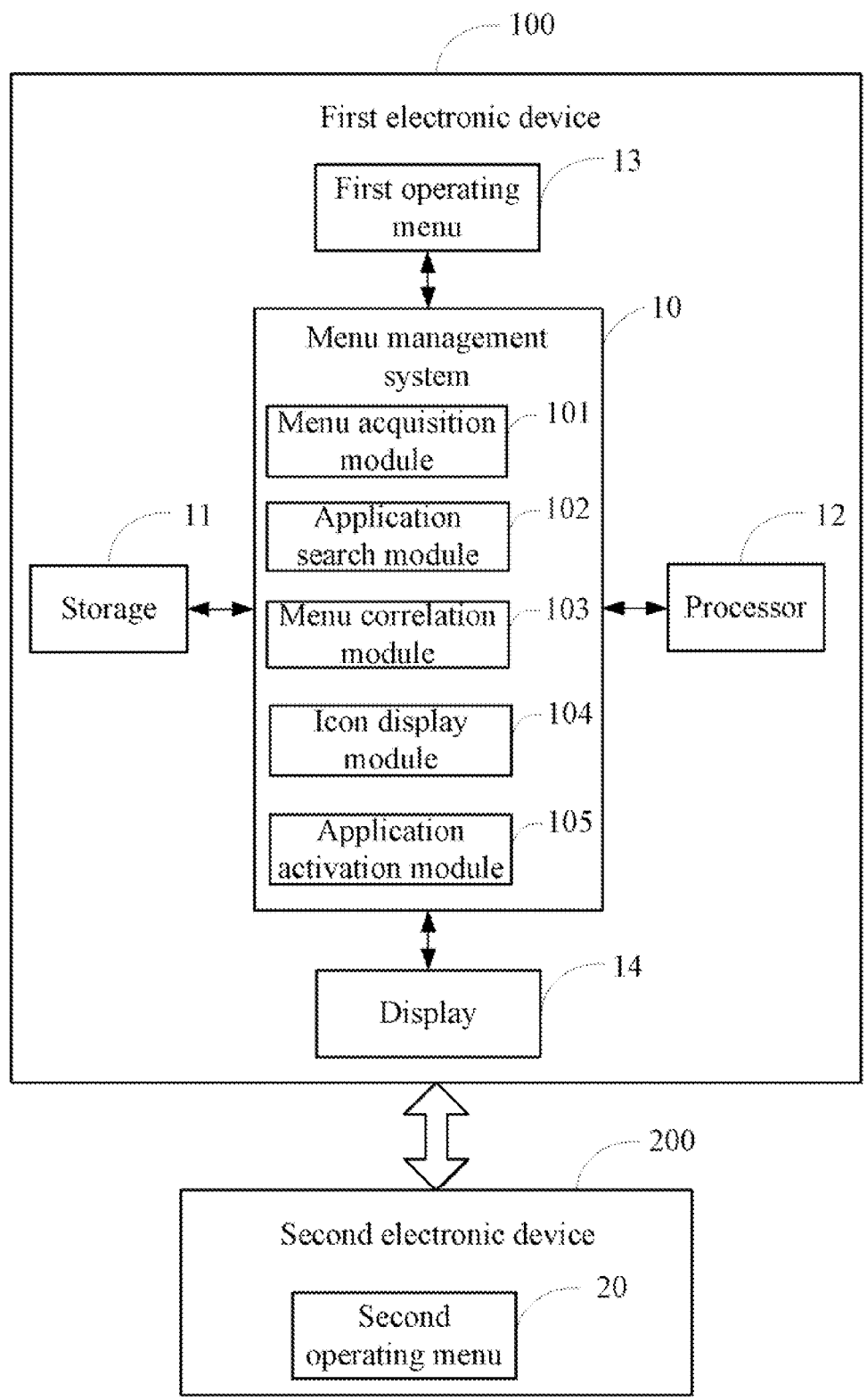
FIG. 1 is a schematic block diagram illustrating one embodiment of a first electronic device communicating with a second electronic device.

FIG. 1 is a schematic block diagram illustrating one embodiment of a first electronic device 100 communicating with a second electronic device 200. The first electronic device 100 includes a menu management system 10, a storage 11, a processor 12, a first operating menu 13, and a display 14. The second electronic device 200 includes a second operating menu 20. Each of the first and second operating menus 13, 20 includes a plurality of operating options (e.g., application icons). In this embodiment, the first electronic device 100 can communicate with the second electronic device 200 via a wired connection (e.g., a data cable) or a wireless connection (e.g. BLUETOOTH® or WIFI®). Both the first and second electronic devices 100, 200 may be a smart phone, a tablet computer, a mobile Internet device (MID), for example. FIG. 1 shows one example of the first and second electronic devices 100 and 200, and they can include more or fewer components than those shown in the embodiment, or have a different configuration of the components.

The menu management system 10 copies functions of the second operating menu 20 from the second electronic device 200 to the first electronic device 100, to allow the first electronic device 100 to be controlled by the second operating menu 20. The menu management system 10 may include a plurality of programs in the form of one or more computerized instructions stored in the storage 11 and executed by the processor 12 to perform operations of the electronic device 200. In the embodiment, the menu management system 10 includes a menu acquisition module 101, an application search module 102, a menu correlation module 103, an icon display module 104, and an application activation module 105. The storage 11 may be an external or embedded storage medium of the first electronic device 100, which may be, for example, a secure digital memory (SD) card, a Trans Flash (TF) card, a compact flash (CF) card, or a smart media (SM) card.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

Figure 2:
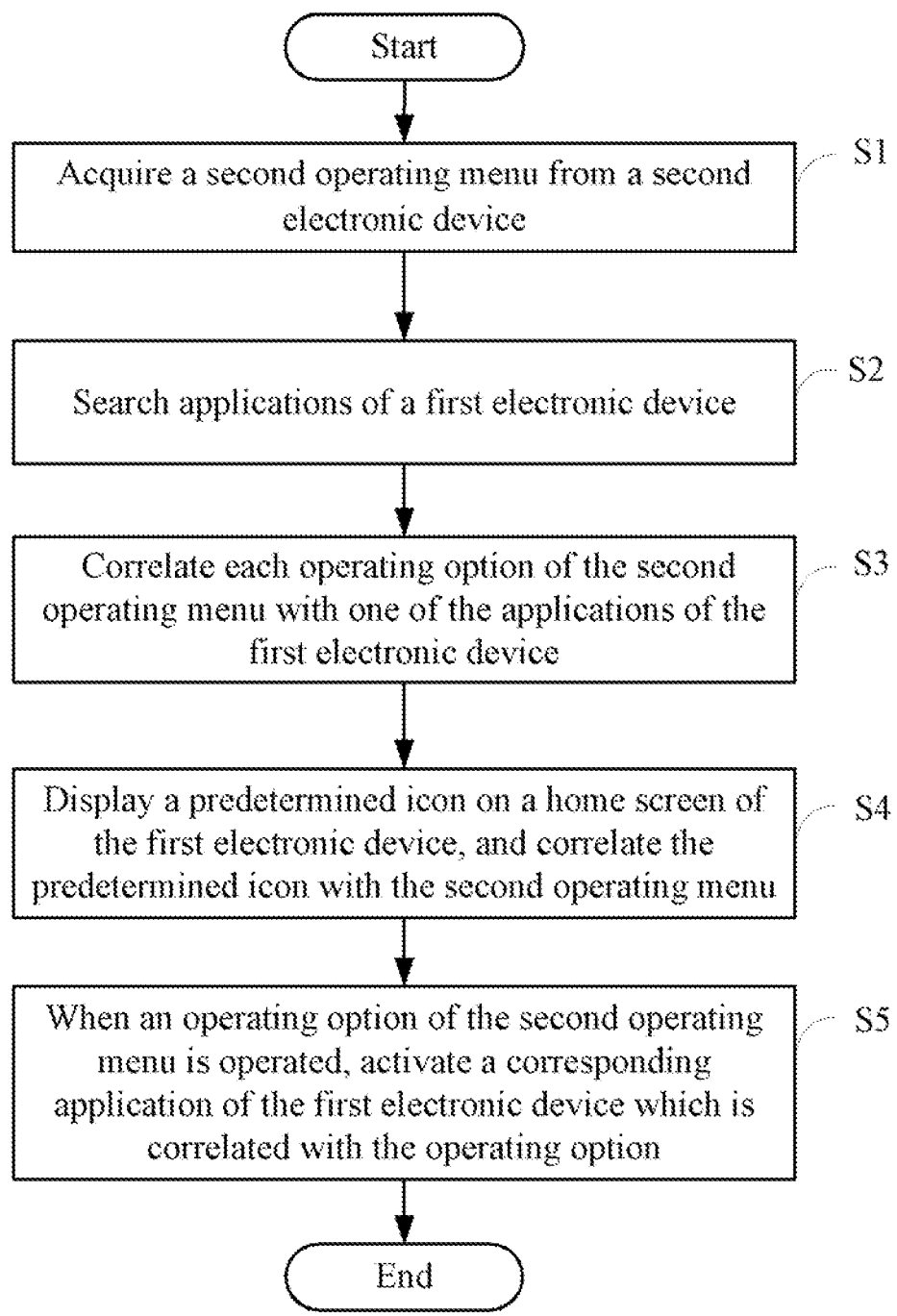
FIG. 2 is a flowchart of one embodiment of a menu management method of the first electronic device of FIG. 1.

FIG. 2 shows a flowchart of one embodiment of a menu management method using the functional modules of the menu management system 10 of FIG. 1. Depending on the embodiment, additional steps may be added, others removed, and the ordering of the steps may be changed.

In step S1, the menu acquisition module 101 acquires the second operating menu 20 from the second electronic device 200.

In this embodiment, the menu acquisition module 101 sends a request message to the second electronic device 200 to request to acquire the second operating menu 20. Then, when the second electronic device 200 receives the request message and agrees with the request, the menu acquisition module 101 automatically acquires the second operating menu 200 from a directory of the second electronic device 200 where the second operating menu 20 is stored. The acquired second operating menu 20 is stored in the storage 11 of the first electronic device 100.

In step S2, the application search module 102 searches applications of the first electronic device 100.

In step S3, the menu correlation module 103 correlates each operating option of the second operating menu 20 with one of the applications of the first electronic device 100.

In this embodiment, the menu correlation module 103 compares a name of each operating option of the second operating menu 20 with a name of each of the applications of the first electronic device 100. When an operating option of the second operating menu 20 having a name that is the same as or similar to a name of an application of the first electronic device 100, the operating option is correlated with the application of the first electronic device 100. When a particular operating option (e.g., "Icon N" of FIG. 3) having a name that is not the same as or not similar to a name of any of the applications of the first electronic device 100, the menu correlation module 103 generates a notification to notify a user to select one of the applications of the first electronic device 100, and correlates a selected application with the particular operating option.

Figure 3:
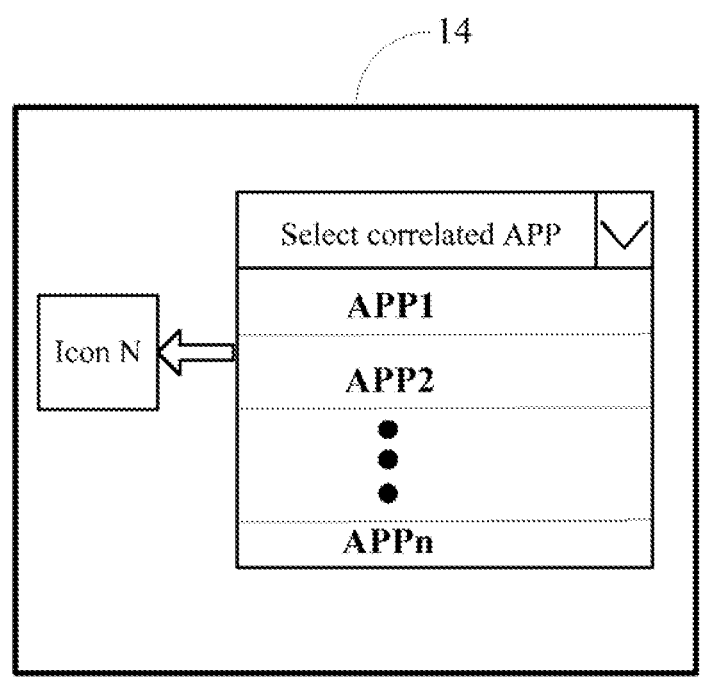
FIG. 3 shows a schematic view of a user interface of the first electronic device of FIG. 1.

FIG. 3 shows that the notification may be a user interface displayed on the display 14 of the first electronic device 100, the user interface displays a list of the applications (e.g., APP1, APP2, . . . , APPn) of the first electronic device 100, so as to notify the user to select an application from the list.

In addition, if all of the applications of the first electronic device 100 are not appropriate to correlate with the particular operating option, the particular operating option can be manually deleted from the second operating menu 20 that is stored in the storage 11 of first electronic device 100. In other embodiments, the menu correlation module 103 may download an application corresponding to the particular operating option via a network, and then correlates the downloaded application with the particular operating option.

Figure 4:
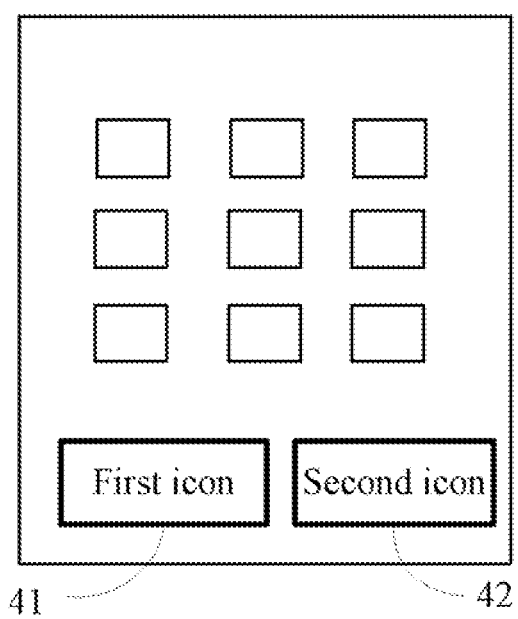
FIG. 4 shows a schematic view of a home screen of the first electronic device of FIG. 1.

In step S4, the icon display module 104 displays a predetermined icon (e.g., a first icon 41 of FIG. 4) on a home screen of the first electronic device 100, and correlates the predetermined icon with the second operating menu 20 stored in the storage 11. When the predetermined icon is operated (e.g., touched or clicked), the second operating menu 20 stored in the storage 11 is displayed on the display 14. In other embodiment, the home screen of the first electronic device 100 further comprises a main icon (e.g., a second icon 42 of FIG. 4) correlated with the first operating menu 13 of the first electronic device 100. When the main icon is operated, the first operating menu 13 is displayed on the display 14.

In step S5, when an operating option of the second operating menu 20 is operated, the application activation module 105 activates a corresponding application of the first electronic device 100 which is correlated with the operating option.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized menu management method implemented by a first electronic device having a first operating menu, the first electronic device communicating with a second electronic device having a second operating menu, the method comprising:
   acquiring the second operating menu from the second electronic device and storing the second operating menu in a storage of the first electronic device;
   searching applications of the first electronic device;
   correlating each operating option of the second operating menu with one of the applications of the first electronic device; and
   activating a corresponding application of the first electronic device correlated with an operating option of the second operating menu stored in the storage, when the operating option is operated;
   wherein the method further comprise:
   displaying a predetermined icon on a home screen of the first electronic device;
   correlating the predetermined icon with the second operating menu stored in the storage; and
   displaying the second operating menu stored in the storage on a display of the first electronic device, when the predetermined icon is operated.

2. The method according to claim 1, wherein the step of acquiring the second operating menu from the second electronic device comprises:
   sending a request message to the second electronic device to request to acquire the second operating menu; and
   acquiring the second operating menu from a directory of the second electronic device where the second operating menu is stored, when the second electronic device receives the request message and agrees with the request.

3. The method according to claim 1, wherein the step of correlating each operating option of the second operating menu with one of the applications of the first electronic device comprises:
   comparing a name of each operating option of the second operating menu with a name of each of the applications of the first electronic device; and
   in response to an operating option of the second operating menu having a name that is the same as or similar to a name of an application of the first electronic device, correlating the operating option with the application of the first electronic device.

4. The method according to claim 3, wherein the step of correlating each operating option of the second operating menu with one of the applications of the first electronic device further comprises:
   generating a notification to notify a user to select one of the applications of the first electronic device, when a particular operating option of the second operating menu having a name that is not the same as or not similar to a name of any of the applications of the first electronic device; and
   correlating a selected application with the particular operating option.

5. The method according to claim 4, wherein the notification is a user interface displayed on a display of the first electronic device, and the user interface displays a list of the applications of the first electronic device.

6. The method according to claim 1, wherein the home screen of the first electronic device further comprises a main icon correlated with the first operating menu of the first electronic device, and the first operating menu is displayed on the display when the main icon is operated.

7. A first electronic device having a first operating menu and communicating with a second electronic device having a second operating menu, comprising:
   a storage;
   a display;
   a processor; and
   one or more programs executed by the processor to perform a method of:
   acquiring the second operating menu from the second electronic device and storing the second operating menu in the storage;
   searching applications of the first electronic device;
   correlating each operating option of the second operating menu with one of the applications of the first electronic device;
   activating a corresponding application of the first electronic device correlated with an operating option of the second operating menu stored in the storage, when the operating option is operated;
   displaying a predetermined icon on a home screen of the first electronic device;
   correlating the predetermined icon with the second operating menu stored in the storage; and
   displaying the second operating menu stored in the storage on the display of the first electronic device, when the predetermined icon is operated.

8. The first electronic device according to claim 7, wherein the step of acquiring the second operating menu from the second electronic device comprises:
   sending a request message to the second electronic device to request to acquire the second operating menu; and
   acquiring the second operating menu from a directory of the second electronic device where the second operating menu is stored, when the second electronic device receives the request message and agrees with the request.

9. The first electronic device according to claim 7, wherein the step of correlating each operating option of the second operating menu with one of the applications of the first electronic device comprises:

comparing a name of each operating option of the second operating menu with a name of each of the applications of the first electronic device; and in response to an operating option of the second operating menu having a name that is the same as or similar to a name of an application of the first electronic device, correlating the operating option with the application of the first electronic device.

10. The first electronic device according to claim 9, wherein the step of correlating each operating option of the second operating menu with one of the applications of the first electronic device further comprises:

generating a notification to notify a user to select one of the applications of the first electronic device, when a particular operating option of the second operating menu having a name that is not the same as or not similar to a name of any of the applications of the first electronic device; and correlating a selected application with the particular operating option.

11. The first electronic device according to claim 10, wherein the notification is a user interface displayed on the display of the first electronic device, and the user interface displays a list of the applications of the first electronic device.

12. The first electronic device according to claim 7, wherein the home screen of the first electronic device further comprises a main icon correlated with the first operating menu of the first electronic device, and the first operating menu is displayed on the display when the main icon is operated.

\* \* \* \* \*